No. 795,197. Patented July 18, 1905.

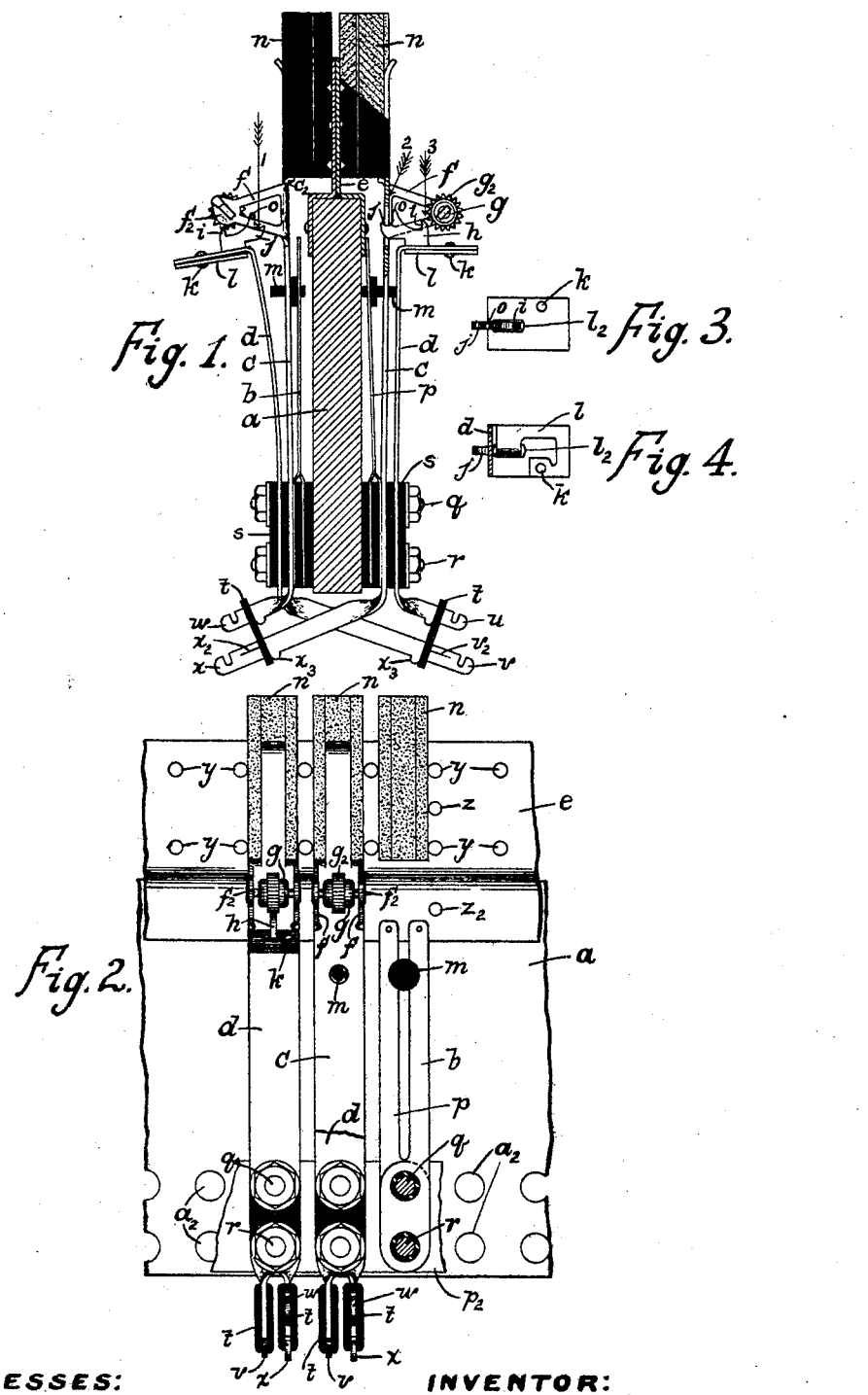

UNITED STATES PATENT OFFICE.

FRANK B. COOK, OF CHICAGO, ILLINOIS.

SELF-SOLDERING PROTECTIVE APPARATUS.

SPECIFICATION forming part of Letters Patent No. 795,197, dated July 18, 1905.

Application filed December 20, 1904. Serial No. 237,728.

*To all whom it may concern:*

Be it known that I, FRANK B. COOK, a citizen of the United States, residing at Chicago, in the county of Cook and State of Illinois, have invented new and useful Improvements in Self-Soldering Protective Apparatus, of which the following is a specification, reference being had to the accompanying drawings illustrating same.

My invention relates to apparatus used in connection with protective devices for electrical circuits, my object being, first, to provide improved means for testing the protective devices and circuits through the apparatus without removing any of the protective devices from their operative positions; second, to provide an improved arrangement for grounding a line-spring and for closing an alarm-circuit when a protective device operates, and, third, to provide an efficient and durable construction in such apparatus which may be readily and cheaply manufactured.

The apparatus of this invention is for the purpose of supporting and operating two classes of electric protective devices—namely, those which protect electrical circuits and apparatus from high-tension electric discharges, such as lightning, and those which protect said circuits and apparatus from small "sneak-currents." The high-tension electric discharges are guarded against by means of lightning-arresters, preferably consisting of carbon blocks with interposed dielectrics, and the sneak-currents are guarded against by means of heat-coils or thermal protectors.

This apparatus comprises spring-supports provided with suitable contacts and arranged for holding the lightning-arresters and heat-coils, the said springs being suitably mounted on a plate which is preferably secured to an iron supporting-frame and conductively connected to earth.

When this apparatus is used in connection with telephone systems to provide protection therefor, the said springs form terminals for the lines, switchboard, and alarm-circuits. When a thermal protector operates, it throws a ground on certain springs of the combination and controls an alarm-circuit and a switchboard-circuit.

In testing the apparatus the test-plug bears against the spring members, which normally engage the thermal protectors and bears them away from the protectors to open the circuits through same. These engaging springs are also provided with means for limiting the movement thereof when the apparatus is set.

I will more particularly describe my invention by reference to the accompanying drawings, in which—

Figure 1 is a plan view of a duplicate set of protective apparatus mounted on opposite sides of a ground-plate with portions shown in cross-section. Fig. 2 is a side elevation of a strip of the protective apparatus with portions removed. Fig. 3 is a top view of spring $d \, l \, h$ of Fig. 1, and Fig. 4 is a bottom view of spring $d \, l \, h$ with the terminal $u$ removed.

Like characters refer to like parts in the several figures.

The ground-plate or mounting-plate $a$ has a ground-strip $e$ secured to one edge thereof, the strip $e$ being provided with projecting points $y \, y$ thereon, between which the carbon lightning-arresters $n \, n$ are placed. On each side of plate $a$ are mounted springs $b \, p \, c \, d$ by suitable bolts $q$ and $r$. Insulating-washers $s \, s$ serve to insulate the springs from each other and from the ground-plate $a$. Opposite sets of springs form a pair for a metallic circuit. Springs $p$ and $b$ of each set lie in the same plane, spring $p$ being an alarm-spring and spring $b$ lying against line-spring $c$ at its mounting to ground $c$ upon the operation of the thermal protector. Springs $c \, c \, d \, d$ have their rearward ends formed into terminals $w$, $x$, $v$, and $u$, respectively, terminals $x$ and $v$ being crossed to opposite sides of plate $a$ through space to arrange like terminals together. An insulating-washer $t$ is threaded over terminals $w$ and $x$ against stops $x^3 \, x^3$ to help stiffen the longer terminal $x$. Terminal $x$ is split at $x^2$ and a small portion turned out slightly to hold the washer $t$ on the terminals. A washer $t$ is threaded over terminals $u$ and $v$ to serve the same purpose as the one on terminals $w$ and $x$. An insulating-pin $m$ extends through each spring $c$ and is used to depress both springs $p$ and $b$ against the ground-strip $e$ when a thermal protector operates, as shown on the right of Fig. 1, to ground the line-spring $c$ and close an alarm-circuit. A thin metallic strip $p^2$ may be secured in contact with the alarm-springs $p$ $p$ to connect all in a common circuit, so that the operation of any one of the protective devices will close the same alarm-circuit. The lightning-arresters $n$ $n$ are placed between the free ends of the line-springs $c$ $c$ and the ground-strip $e$. I have preferably shown the carbon blocks of the lightning-arresters coated with an insulating-enamel, this feature being a part of my copending application, Serial No. 208,933, for lightning-arrester. Each heat-coil is supported in a fixed position between two supporting-arms $f$ $f$, which are a part of spring $c$. Spring $d$ has a spring $l$, riveted thereto at $k$ and preferably formed, as shown in Fig. 4, to give the required flexibility. A portion $h$ of spring $l$ passes through a hole $l^2$ in spring $d$ and is provided with a portion $i$, adapted to engage a tooth $g^2$ of the heat-coil $g$ when the apparatus is in a set position, as shown on the left of Fig. 1, with a portion $o$, adapted to limit the movement of spring $d$ $l$ $h$ when the apparatus is set to operative position, and with a portion $j$, against which a test-plug presses to press the portion $i$ out of engagement with the heat-coil $g$ without operating the spring $d$ when the apparatus is to be tested. Arrows 1, 2, and 3 represent the points at which the contact members of a test-plug engage each set of the apparatus for testing the different circuits through same. After the apparatus is tested the portion $i$ again engages a tooth $g^2$ of the heat-coil, when the test-plug is withdrawn to reset the apparatus to operative position. When the apparatus operates, as shown on the right of Fig. 1, the portion $j$ may pass through a hole in spring $c$, as shown. Springs $d$ $d$ are the switchboard-springs, springs $c$ $c$ the line-springs, and springs $p$ $p$ the alarm-springs.

The heat-coil preferably used in this invention forms the subject-matter of my Patent No. 776,218, issued November 29, 1904.

When an abnormally large current enters the apparatus, as from a line-spring $c$, it traverses the line-spring $c$, heat-coil $g$, and switchboard-spring $d$, and after a short time heats the heat-coil $g$, and thereby softens a heat-susceptible material which allows the body of the heat-coil to turn upon its axis and permit the portion $i$ of spring $h$ to turn the heat-coil and release itself therefrom to open the circuit through the heat-coil and ground-springs $p$ and $c$, as shown upon the right of Fig. 1. The circuit through the heat-coil now being broken, the latter cools, and thereby resolders the body thereof to the axis. The portion $i$ of spring $h$ may now be reëngaged with a tooth $g^2$ of the heat-coil to set the apparatus to operative position, as shown upon the left of Fig. 1, the portion $o$ serving to limit the movement of spring $d$ $l$ $h$ when the apparatus is thus reset.

The thermal protectors may be operated again and again, as just described, as many times as desired.

I do not wish to limit this invention to the particular details of construction as herein shown, as slight modifications in the structure would not be a departure from the invention.

Having thus described my invention, what I claim as new, and desire to secure by Letters Patent, is—

1. In protective apparatus of the class specified, a ground-plate, spring members suitably mounted thereon, a heat-coil suitably mounted on one spring member and normally engaged by another, means on the last-mentioned spring member adapted to limit the movement of the latter when same is engaged with the heat-coil, and means on the last-mentioned spring member adapted to be engaged by a testing-plug to bear the said engaging spring away from the heat-coil to open the circuit for testing.

2. The combination with a thermal protector, of a spring member adapted to engage the protector to operate same under abnormal conditions, means on the said spring member to limit the movement of same when the apparatus is set to an operative position, and means on the said spring member with which a test-plug coöperates to bear the spring member out of engagement with the protector for testing purposes.

3. In apparatus of the class specified, a ground-plate, a line-spring mounted flatwise thereon, a second spring member mounted flatwise upon the ground-plate between the latter and the line-spring and in contact with the latter at its mounting, an alarm-spring mounted flatwise upon the ground-plate and in a plane with the said second spring member, and means for operating the said second spring and the alarm-spring together to bring them in contact with the ground-plate to ground the line-spring and close an alarm-circuit.

4. In protective apparatus of the class specified, a mounting-plate, suitable spring members mounted upon each side of the said plate, some of the terminal ends of the springs being crossed over to opposite sides of the said plate, through space, to arrange like terminals together, and insulating-washers for the pairs of terminals and threaded thereupon to cause one spring of a pair to stiffen the other spring thereof.

5. The combination with a thermal protector, of a spring member adapted to engage the protector to operate same under abnormal conditions, means for limiting the movement of the said spring member when the apparatus is set to an operative position, and means with which a test-plug coöperates to bear the said spring member out of engagement with the protector for testing purposes.

6. The combination with a thermal protector, of means for operating same, and adapted to control a circuit when operated, means for limiting the movement of the said operating means when the apparatus is set to operative position, and means with which a test-plug coöperates to bear the said operating means out of engagement with the protector to open the circuit through the latter for testing.

7. The combination with a thermal protector, of a spring member the free end of which engages the protector to operate same and which is formed into a loop to produce the required tension therein, means on the said free end of the spring member to limit the movement of same when the apparatus is set to an operative position, and means on the said free end of the spring member adapted to coöperate with a test-plug to bear the said spring member out of engagement with the protector for testing the apparatus.

8. In apparatus of the class specified, a ground-plate, a spring member mounted flatwise thereon, a thermal protector suitably mounted on the spring member, a second spring member mounted flatwise on the ground-plate and adapted to engage the thermal protector, means on the last-mentioned spring member to limit the movement thereof when the apparatus is set to operative position, means on the last-mentioned spring member adapted to coöperate with a test-plug to open the circuit through the protector for testing, two spring members mounted flatwise on the ground-plate and both in the same plane, and means whereby the operation of the thermal protector operates both of the said two spring members to close an alarm-circuit and ground the first-mentioned spring member, substantially as described.

9. In apparatus of the class specified, a ground-plate a spring member mounted flatwise thereon, a lightning-arrester inserted between the free end of the said spring member and the ground-plate, a thermal protector suitably mounted on the said spring member, a second spring member mounted flatwise on the ground-plate, outside of the first-mentioned spring member and adapted to engage the thermal protector to operate same under abnormal conditions therein, means on the last-mentioned spring member to limit the movement of the latter when the apparatus is set to operative position, means on the last-mentioned spring member adapted to coöperate with a test-plug to open the circuit through the protector for testing, two spring members mounted flatwise on the ground-plate between the latter and the first-mentioned spring member and both in the same plane, and means whereby the operation of the thermal protector causes the second-mentioned spring member to operate both of the said two spring members and bring them in contact with the ground-plate to close an alarm-circuit and ground the first-mentioned spring member, substantially as described.

10. The combination with a thermal protector comprising a rotary portion normally secured to an axis by a heat-susceptible material, of means for supporting the axis in a fixed position, spring means for engaging the protector to turn same under abnormal current conditions to control a circuit, means on the last-mentioned spring means against which a test-plug presses to bear the last-mentioned spring means out of engagement with the protector for testing, and means on the last-mentioned spring means adapted to limit the movement of same when the apparatus is set.

11. The combination with a self-soldering thermal protector, of spring means for engaging same to operate the device, means to limit the movement of the said spring means when the apparatus is set to operative position, and means with which a test-plug coöperates to disengage the said spring means from the protector for testing, the withdrawal of the test-plug resetting the apparatus to operative position.

12. The combination with a self-soldering thermal protector, of means for connecting same in a circuit, a portion on said means to limit the relative engaging position of the engaging members when the apparatus is set to operative position, and a portion on said means with which a test-plug coöperates to disconnect the said protector from the circuit while testing.

13. The combination with a thermal protector provided with a series of engaging devices, of means for supporting the protector in operative position, a circuit-controlling means adapted to engage an engaging device and to operate the protector to control a circuit and bring another engaging device in engaging position therefor, means on the said circuit-controlling means to limit the movement of same when the apparatus is set to operative position, and means on said circuit-controlling means with which a test-plug coöperates to disengage the said circuit-controlling means from the protector for testing.

14. In apparatus of the class specified, a thermal protector two spring members arranged parallel to each other and in the same plane, and means for operating the protector under abnormal conditions to operate the said spring members to control respective circuits.

15. In protective apparatus of the class specified, a mounting-plate, terminal members suitably mounted on said plate, some of which are crossed over to opposite sides of the plate, through space, to arrange like terminals together, and insulating-washers threaded over like terminals to cause one to stiffen the other.

16. In protective apparatus of the class specified, a mounting-plate, a terminal member for each side of said plate and mounted thereon, one said terminal being crossed over to the opposite side of the said plate, through space, and an insulating-washer threaded over the ends of the said terminals, and suitably held in place, to cause one terminal to stiffen the other.

As inventor of the foregoing I hereunto subscribe my name, in the presence of two subscribing witnesses, this 16th day of December, A. D. 1904.

FRANK B. COOK.

Witnesses:
FREDERICK R. PARKER,
F. W. PARDEE.